US010542165B2

(12) United States Patent
Yu

(10) Patent No.: US 10,542,165 B2
(45) Date of Patent: Jan. 21, 2020

(54) IMAGE PROCESSING APPARATUS FOR ARRANGING MARKS AT SCHEDULED CUTTING POSITIONS

(71) Applicant: KONICA MINOLTA, INC., Chiyoda-ku, Tokyo (JP)

(72) Inventor: Kazutoshi Yu, Kobe (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 15/882,146

(22) Filed: Jan. 29, 2018

(65) Prior Publication Data

US 2018/0227449 A1    Aug. 9, 2018

(30) Foreign Application Priority Data

Feb. 7, 2017    (JP) .................................. 2017-020028

(51) Int. Cl.
*G06K 15/00*    (2006.01)
*H04N 1/00*    (2006.01)

(52) U.S. Cl.
CPC ..... *H04N 1/00676* (2013.01); *H04N 1/00602* (2013.01); *H04N 1/00641* (2013.01); *H04N 1/00798* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 5,085,417 A | 2/1992 | Copham | |
| 6,216,142 B1* | 4/2001 | Iwasaki | G06F 17/217 |
| | | | 715/201 |
| 6,825,948 B1* | 11/2004 | Hayashi | G03B 27/462 |
| | | | 358/1.18 |
| 8,284,438 B2 | 10/2012 | Yamaguchi et al. | |
| 8,587,611 B2* | 11/2013 | Outram | G09G 5/00 |
| | | | 345/619 |
| 8,964,241 B2 | 2/2015 | Mizuguchi | |
| 2005/0281184 A1* | 12/2005 | Sakata | B26D 5/00 |
| | | | 369/275.3 |

(Continued)

FOREIGN PATENT DOCUMENTS

| | | |
|---|---|---|
| JP | 2002211071 A | 7/2002 |
| JP | 2007118221 A | 5/2007 |

(Continued)

OTHER PUBLICATIONS

Extended European Search Report (EESR) dated Jun. 6, 2018 issued in counterpart European Application No. 18155249.8.

(Continued)

*Primary Examiner* — Dung D Tran
(74) *Attorney, Agent, or Firm* — Holtz, Holtz & Volek PC

(57) ABSTRACT

An MFP (Multifunction Peripheral) is an image processing apparatus used for a printing method. In the printing method, plural kinds of images are printed on paper. The paper is trimmed after printing. Thereby, each of plural kinds of images can be obtained. The MFP includes a mark attaching unit that arranges marks corresponding to each of a plurality of kinds of images at scheduled cutting positions. As a result, it is possible to easily sort the sheets after cutting.

18 Claims, 11 Drawing Sheets

(56) References Cited

U.S. PATENT DOCUMENTS

| | | | |
|---|---|---|---|
| 2007/0266878 A1* | 11/2007 | Underwood | G03G 15/5029 101/484 |
| 2010/0328722 A1* | 12/2010 | Yasunaga | G06F 3/1208 358/1.15 |
| 2011/0211899 A1* | 9/2011 | Teshigawara | B41J 11/663 400/621 |
| 2014/0253936 A1* | 9/2014 | Mizuguchi | G06F 3/1211 358/1.13 |
| 2015/0165793 A1* | 6/2015 | Shimura | B41J 11/663 347/16 |
| 2016/0086070 A1* | 3/2016 | Kikumoto | G06K 15/408 358/1.15 |
| 2016/0124690 A1* | 5/2016 | Kimura | G06F 3/1241 358/1.15 |
| 2018/0022118 A1* | 1/2018 | Solans | B41J 11/68 347/110 |

FOREIGN PATENT DOCUMENTS

| | | |
|---|---|---|
| JP | 2007181992 A | 7/2007 |
| JP | 2008167375 A | 7/2008 |
| JP | 2009124472 A | 6/2009 |
| JP | 2011167934 A | 9/2011 |
| JP | 2016124236 A | 7/2016 |

OTHER PUBLICATIONS

Chinese Office Action (and English language translation thereof) dated Jul. 2, 2019 issued in counterpart Chinese Application No. 20180116723.6.

European Office Action dated Oct. 15, 2019 issued in counterpart European Application No. 18155249.8.

* cited by examiner

IMAGE PROCESSING APPARATUS FOR ARRANGING MARKS AT SCHEDULED CUTTING POSITIONS

The entire disclosure of Japanese patent application No. 2017-20028 filed on Feb. 7, 2017, is incorporated herein by reference in its entirety.

BACKGROUND

Technological Field

The present invention relates to an image processing apparatus, an image forming apparatus, a control program for an image processing apparatus, and a control program for an image forming apparatus. More specifically, the present invention relates to an image processing apparatus, an image forming apparatus, a control program for an image processing apparatus, and a control program for an image forming apparatus used for a printing method for printing a plurality of kinds of images on a sheet, and cutting each sheet after the printing, so as to obtain each of the plurality of kinds of images.

Description of the Related Art

As electrophotographic image forming apparatuses, there are an MFP (Multi Function Peripheral) provided with a scanner function, a facsimile function, a copying function, a function as a printer, a data communication function and a server function, a facsimile apparatus, a copying machine, a printer, and the like.

There is a printing method in which an image in which a plurality of kinds of images are allocated on one sheet of paper or an image in which each of kinds of images is allocated on one sheet one by one is printed. Each of the plural kinds of images is obtained in a desired form, by cutting the sheet after printing as post processing.

Techniques for distinguishing a plurality of kinds of images are disclosed in, for example, Documents 1 to 4 below. In the document 1, there is disclosed a printer equipped with an allocating unit, an image synthesizing unit, a buffer memory, and the like. When the index processing mode is selected, the assignment unit assigns the symbol data to the job data. From the job data, print image data and the like are analyzed, and the print image data and the symbol data are synthesized by the image synthesizer. The synthesized and newly generated print image data is developed in the buffer memory. The print engine executes printing based on the print image developed in the buffer memory. Different symbols are printed on the edge of the printing paper for each job.

Document 2 discloses an image forming apparatus that prints a prime code image at an end portion of each sheet of a plurality of sheets, when performing printing on a plurality of sheets. The prime code image is an image in which any one of a predetermined number of regions continuous in the extending direction of the paper edge is reproduced in black and the other regions are reproduced in white. For each of the prime code images, the image forming apparatus performs printing by sequentially shifting regions to be reproduced as black in the X direction in the printing order of the respective sheets, and repeated patterns are formed on the side surfaces of the sheet bundle.

Document 3 below discloses an image forming apparatus that inputs thickness data per sheet to be printed, sheet size data, and print sheet number data, using an operation panel. In this image forming apparatus, side image data to be visualized on the side face of a sheet bundle is read out, side image data is line-divided by the number of printed sheets, and an index value is assigned to each divided side image data and stored. The image forming apparatus generates an image formation image to be printed on the side of the sheet bundle. If it is not the desired image, enlargement/reduction processing is performed. If the image is desired, the print source image is input and the print position of the side image data is determined. Then, the normal image data and the side image data are merged and printed using a normal print head.

A printing apparatus is disclosed in the following Document 4. The printing apparatus receives a plurality of jobs arranging a plurality of images having a width narrower than the width of the continuous paper in the conveying direction of the continuous paper. The printing apparatus arranges the image data of the plurality of received jobs in the width direction of the continuous paper. The printing apparatus arranges band-shaped images extending in the conveying direction in an area between adjacent jobs. In this printing apparatus, images of the plurality of jobs and band-like images are printed on the continuous paper. Since the printed continuous paper is divided for each job, it is cut so as to straddle the belt-like image along the conveying direction.

DOCUMENTS

Document(s) Related to Patent(s)

[Document 1] Japanese Unexamined Patent Application Publication No. 2007-118221
[Document 2] Japanese Unexamined Patent Application Publication No. 2009-124472
[Document 3] Japanese Unexamined Patent Application Publication No. 2007-181992
[Document 4] Japanese Unexamined Patent Application Publication No. 2016-124236

The image printed on the sheet differs for each sheet. For this reason, when sorting sheets for each image after cutting, it is necessary to visually check the printed image while flipping the printed sheets one by one. This is complicated jobs.

SUMMARY

The present invention is intended to solve the above problems. An object of the present invention is to provide an image processing apparatus, an image forming apparatus, a control program of an image processing apparatus, and a control program of an image forming apparatus which can easily sort papers after cutting.

To achieve at least one of the abovementioned objects, according to an aspect of the present invention, an image processing apparatus reflecting one aspect of the present invention, is used in a printing method for obtaining each of plural kinds of images by printing the plural kinds of images on paper, and cutting it after the printing, comprises a hardware processor that: arranges marks corresponding to the plural kinds of images at scheduled cutting positions.

According to another aspect of the invention, an image forming apparatus used in a printing method for obtaining each of plural kinds of images by printing the plural kinds of images on paper, and cutting it after the printing, comprises a hardware processor that: receives input of the plural kinds of images, and forms an image in which marks corresponding to each of the plural kinds of images received are arranged at scheduled cutting positions.

According to another aspect of the invention, a non-transitory computer-readable recording medium storing a controlling program for an image processing apparatus used in a printing method for obtaining each of plural kinds of images by printing the plural kinds of images on paper, and cutting it after the printing, the program causes a computer to execute: arranging marks corresponding to the plural kinds of images at scheduled cutting positions.

According to another aspect of the invention, a non-transitory computer-readable recording medium storing a controlling program for an image forming apparatus used in a printing method for obtaining each of plural kinds of images by printing the plural kinds of images on paper, and cutting it after the printing, the program causes a computer to execute the steps of: receiving input of the plural kinds of images, and forming an image in which marks corresponding to each of the plural kinds of images received are arranged at scheduled cutting positions.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, one or more embodiments of the present invention will be described with reference to the drawings. However, the scope of the invention is not limited to the disclosed embodiments.

In the following embodiments, a case where the image processing apparatus and the image forming apparatus are MFPs will be described. Besides the case where the image forming apparatus is an MFP, it may be a printer, a copying machine, a facsimile, or the like. The image processing apparatus may be an image forming apparatus other than the MFP, a PC (Personal Computer), a smartphone, or the like. Further, in the following embodiments, it is assumed that the MFP is used in a situation where images such as leaflets or postcards are commercially printed. It may be premised that the MFP is used in a situation where printing in an office or printing by an individual is performed.

First Embodiment

First, the configuration of the image forming apparatus according to the present embodiment will be described.

Figure 1:
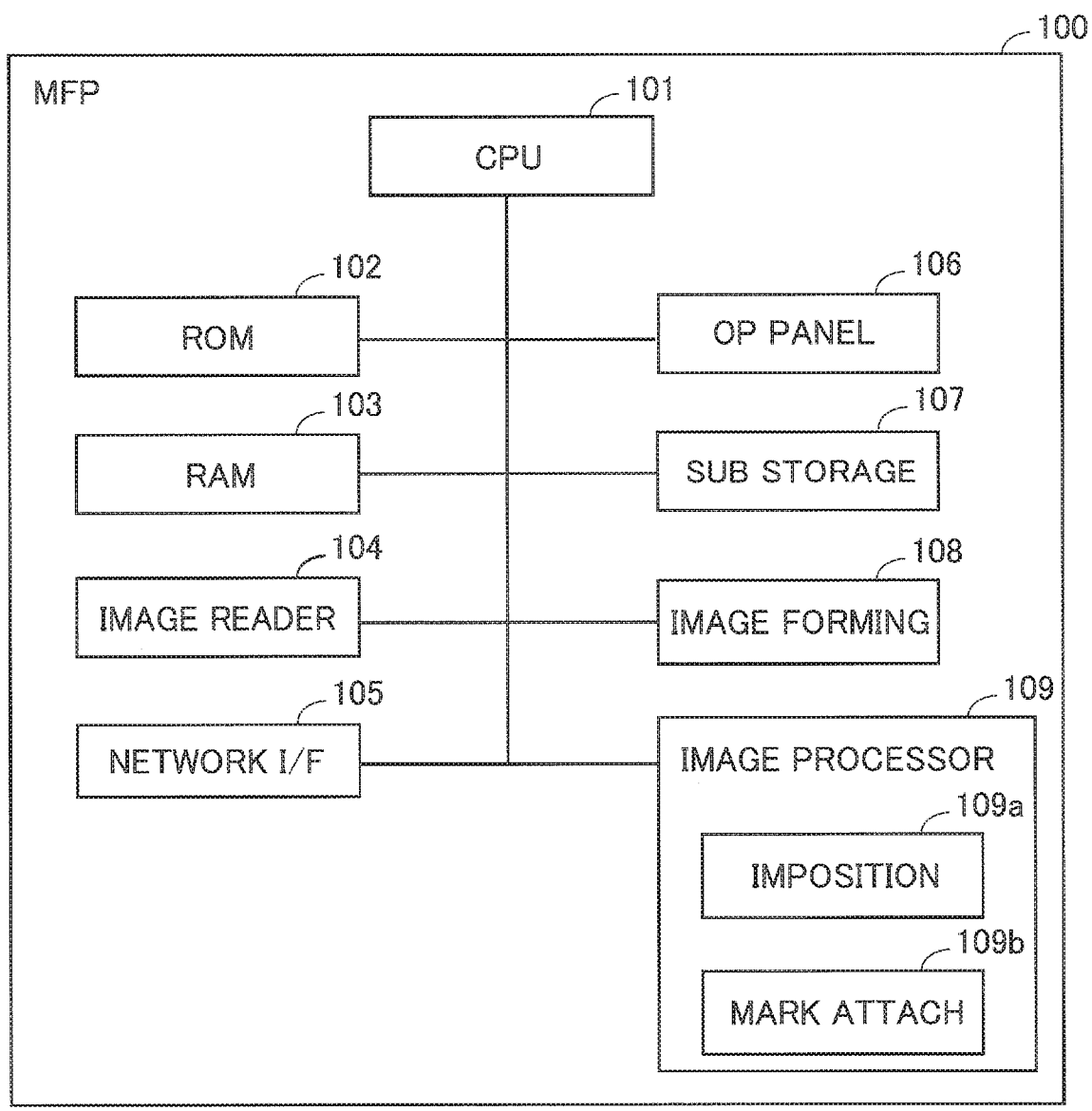
FIG. 1 is a diagram showing a configuration of an MFP 100 according to a first embodiment of the present invention.

FIG. 1 is a diagram showing a configuration of an MFP 100 according to a first embodiment of the present invention.

With reference to FIG. 1, an MFP 100 (an example of an image processing apparatus or an image forming apparatus) according to this embodiment will be described. The MFP 100 is used for a printing method of printing a plurality of kinds of images on a sheet and cutting each sheet after printing, so as to obtain each of the plurality of kinds of images. The MFP 100 is equipped with a CPU (Central Processing Unit) 101, a ROM (Read Only Memory) 102, a RAM (Random Access Memory) 103, an image reading unit 104, a network interface 105, an operation panel 106, an auxiliary storage device 107, an image forming unit 108, an image processing unit 109, and the like. The CPU 101, the ROM 102, the RAM 103, the image reading unit 104, the network interface 105, the operation panel 106, the auxiliary storage device 107, the image forming unit 108, and the image processing unit 109 are connected to each other by a bus or the like.

The CPU 101 operates in accordance with a control program, and controls the entire MFP 100.

The ROM 102 stores a control program.

The RAM 103 is a work memory for the CPU 101, and temporarily stores various data.

The image reading unit 104 reads the image of the document.

The network interface 105 transmits and receives information to and from an external device connected to the MFP 100, via a network (not shown).

The operation panel 106 displays various information and accepts various operations, such as input of a print job.

The auxiliary storage device 107 is, for example, an HDD (Hard Disk Drive), and stores various data such as image data read by the image reading unit 104.

The image forming unit 108 (an example of an image forming unit) prints on a sheet inside the casing of the MFP 100. The image forming unit 108 is roughly constituted by a toner image forming unit, a fixing device, a sheet conveying section, and the like. The image forming unit 108 forms an image on a sheet by, for example, an electrophotographic method. The toner image forming unit synthesizes images of four colors in a so-called tandem system, and forms a color image on a sheet. The toner image forming unit comprises of photosensitive members provided for each color of C (cyan), M (magenta), Y (yellow), and K (black), an intermediate transfer belt on which toner images are transferred (primary transfer) from the photosensitive members, and a transfer unit for transferring (secondary transfer) an image from the intermediate transfer belt to the sheet. The fixing device has a heating roller and a pressure roller. The fixing device conveys a sheet on which a toner image is formed by a heating roller and a pressure roller, while sandwiching the sheet, and heats and pressurizes the sheet. As a result, the fixing device melts the toner adhered to the paper, fixes the toner on the paper, and forms an image on the paper. The sheet conveying section is composed of paper feed rollers, transport rollers, motors for driving them, and the like. The sheet conveying section feeds a sheet from a sheet feeding cassette, and conveys it inside the casing of the MFP 100. Further, the sheet conveying section discharges the sheet printed inside the casing of the MFP 100 to the outside of the casing of the MFP 100.

The image processing unit 109 corrects the image of the print job, the image read by the image reading unit 104, and the like. The image processing unit 109 includes an imposition unit 109*a* (an example of an imposition unit) and a mark attaching unit 109*b* (an example of an arranging unit). When printing a plurality of kinds of images, the imposition unit 109*a* allocates segmented areas, which are areas for forming images of the plurality of kinds of images, in the plane of the paper on the image data. When a plurality of kinds of images are printed, the mark attaching unit 109*b* arranges marks corresponding to each of the plural kinds of images on the image data, at the scheduled cutting positions.

Next, the operation of the MFP 100 in the present embodiment will be described.

Figure 2:
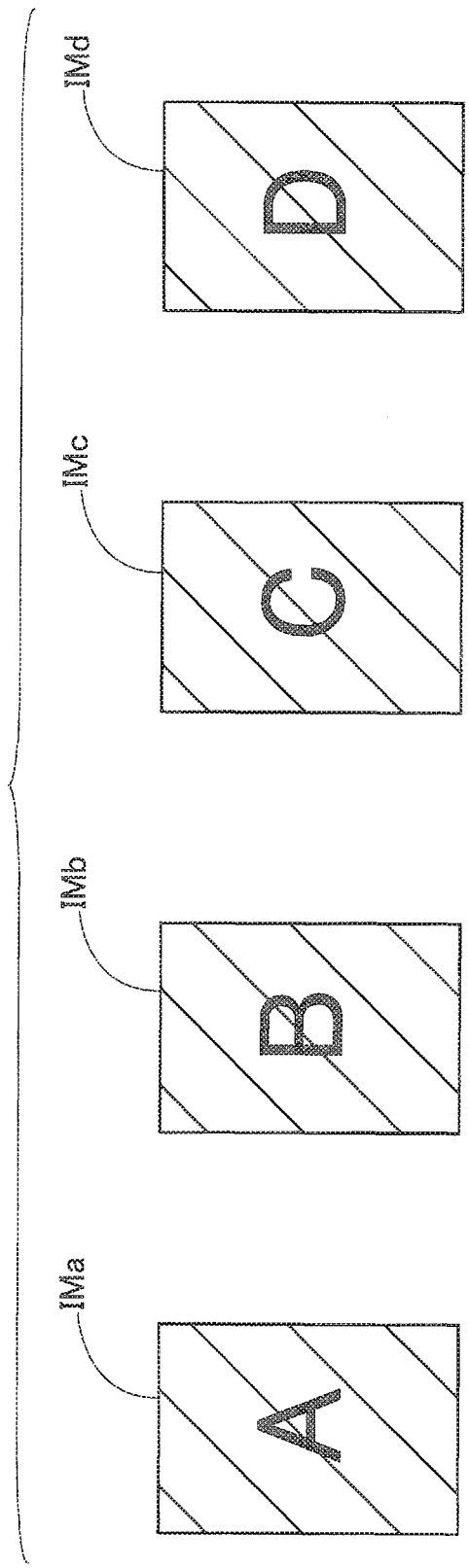
FIG. 2 is a diagram conceptually showing contents of print jobs received by the MFP 100 in the first embodiment of the present invention.

FIG. 2 is a diagram conceptually showing contents of print jobs received by the MFP 100, in the first embodiment of the present invention.

Referring to FIG. 2, MFP 100 receives input of a plurality of print jobs JA, JB, JC, and JD from the user within a predetermined time, through operation panel 106 or external devices. The print job JA is a job for printing 150 copies of the image IMa having the character "A". The print job JB is a job for printing 120 copies of the image IMb having the character "B". The print job JC is a job for printing 80 copies of the image IMc having the character "C". The print job JD is a job for printing 50 copies of the image IMd having the character "D". The images IMa, IMb, IMc and IMd are images of different kinds (designs).

The MFP 100 accepts the plurality of print jobs JA, JB, JC, and JD within a predetermined time. In this case, the MFP 100 performs ganging for imposing (assigning) the images IMa, IMb, IMc, and IMd of the plurality of print jobs JA, JB, JC, and JD on a sheet.

Figure 3:
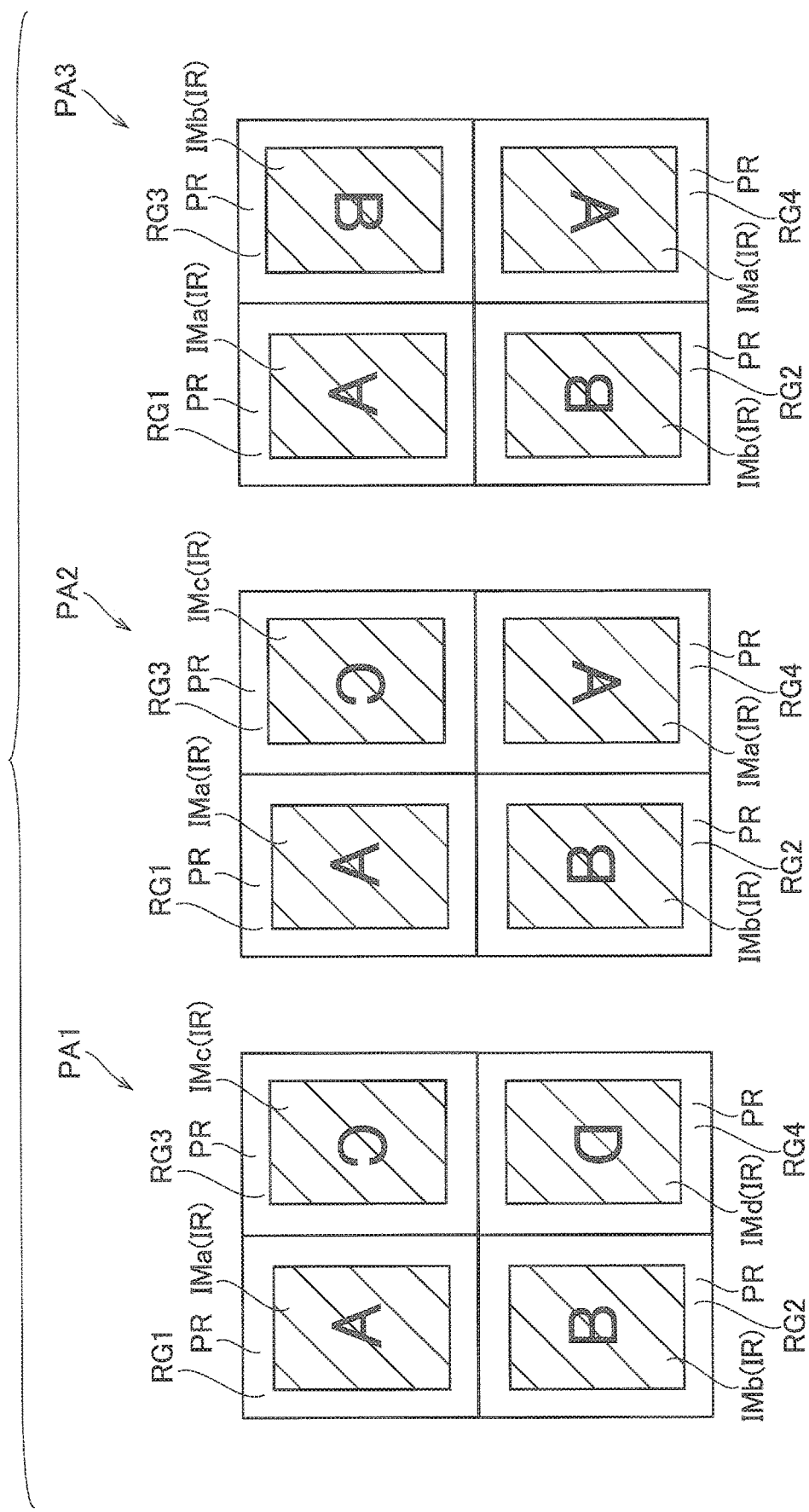
FIG. 3 is a diagram showing imposition patterns PA1, PA2, and PA3 created by imposing images IMa, IMb, IMc, and IMd on a sheet in the first embodiment of the present invention.

FIG. 3 is a diagram showing imposition patterns PA1, PA2, and PA3 created by imposing images IMa, IMb, IMc, and IMd on a sheet, in the first embodiment of the present invention.

Referring to FIG. 3, MFP 100 performs imposition process. The imposition process is to allocate segmented areas of plural kinds of images in a surface of one sheet of paper. Thereby, imposition patterns PA1, PA2, and PA3 are created.

Each of the imposition patterns PA1, PA2, and PA3 has four segmented areas RG1, RG2, RG3, and RG4, which are regions for forming images. The segmented area RG1 is an upper left region in the surface of the sheet. The segmented area RG2 is a region on the lower left side in the surface of the sheet. The segmented area RG3 is an upper right region in the surface of the sheet. The segmented area RG4 is a region on the right lower side in the surface of the sheet. As the imposition process, the MFP 100 arranges (assigns) the images IMa, IMb, IMc, or IMd to each of the segmented areas RG1, RG2, RG3, and RG4 of the imposition patterns PA1, PA2, and PA3.

Each of the segmented areas RG1, RG2, RG3, and RG4 includes an image region IR (a region indicated by hatching in the segmented area) and a peripheral region PR (a region indicated by a white background in the segmented area). The image region IR (the region indicated by hatching in the segmented area) is the area where the images IMa, IMb, IMc, or IMd are placed. The outer peripheral region PR (the region indicated by the white background in the segmented area) is a region provided on the outer periphery of the image region.

When looking to the imposition pattern PA1, the segmented area RG1 is a segmented area to which the image IMa is allocated. The image IMa is arranged in the upright state in the image region IR of the segmented area RG1. The segmented area RG2 is a segmented area to which the image IMb is allocated. In the image region IR of the segmented area RG2, the image IMb is arranged in an upright state. The segmented area RG3 is a segmented area to which the image IMc is allocated. In the image region IR of the segmented area RG3, the image IMc is arranged in an inverted state. The segmented area RG4 is a segmented area to which the image IMd is allocated. In the image region IR of the segmented area RG4, the image IMd is arranged in an inverted state.

When looking to the imposition pattern PA2, the segmented area RG1 is a segmented area to which the image IMa is allocated. The image IMa is arranged in the upright state in the image region IR of the segmented area RG1. The segmented area RG2 is a segmented area to which the image IMb is allocated. In the image region IR of the segmented area RG2, the image IMb is arranged in an upright state. The segmented area RG3 is a segmented area to which the image IMc is allocated. In the image region IR of the segmented area RG3, the image IMc is arranged in an inverted state. The segmented area RG4 is a segmented area to which the image IMa is allocated. In the image region IR of the segmented area RG4, the image IMa is arranged in an inverted state.

When looking at the imposition pattern PA3, the segmented area RG1 is a segmented area to which the image IMa is allocated. The image IMa is arranged in the upright state in the image region IR of the segmented area RG1. The segmented area RG2 is a segmented area to which the image IMb is allocated. In the image region IR of the segmented area RG2, the image IMb is arranged in an upright state. The segmented area RG3 is a segmented area to which the image IMb is allocated. In the image region IR of the segmented area RG3, the image IMb is arranged in an inverted state. The segmented area RG4 is a segmented area to which the image IMa is allocated. In the image region IR of the segmented area RG4, the image IMa is arranged in an inverted state.

Here, it is assumed that the MFP 100 performs the following output. 50 sheets of the paper on which the image including the imposition pattern PA1 is printed on the front surface is output. 30 sheets of paper on which the image including the imposition pattern PA2 is printed on the front surface is output. 20 sheets of paper on which the image including the imposition pattern PA3 is printed on the front surface is output. (A total of 100 copies are output.)

Figure 4:
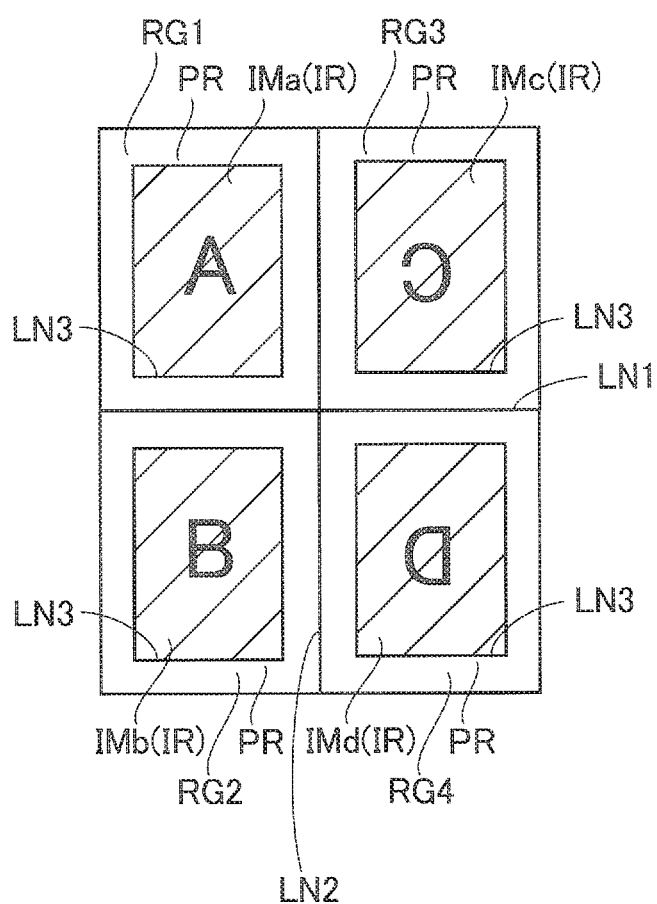
FIG. 4 is a diagram showing scheduled cutting positions of the imposition pattern PA1, according to the first embodiment of the present invention.

FIG. 4 is a diagram showing scheduled cutting positions of an imposition pattern PA1, according to the first embodiment of the present invention.

Referring to FIG. 4, the user cuts the paper on which the imposition pattern PA1 is printed, the paper on which the imposition pattern PA2 is printed, and the paper on which the imposition pattern PA3 is printed, with lines LN1 and LN 2, which are scheduled positions for cutting. As a result, the segmented areas RG1, RG2, RG3, and RG4 are separated. The line LN1 extends parallel to the short side of the paper (in the lateral direction in FIG. 4). The line LN2 extends parallel to the long side (longitudinal direction in FIG. 4) of the paper. Line LN1 and line LN2 are orthogonal to each other.

Next, the user separates the image region IR and the peripheral region PR with the line LN3, which is the scheduled cutting position of the boundary, in each of the segmented areas RG1, RG2, RG3, and RG4. In this manner, a plurality of images are collectively printed on one sheet of paper, and the sheet is cut after printing. The user can obtain desired numbers of images IMa, IMb, IMc, and IMd, while suppressing the number of sheets of paper to be printed.

By the way, when the number of print copies of each of a plurality of print jobs is the same, the user can sort them into images of respective print jobs simply by cutting them with the scheduled cutting lines. However, as described above, when the number of print copies of each of the plurality of print jobs JA, JB, JC, and JD is different from each other, it can not be done as such. The user prints the images of the imposition patterns PA1, PA2, and PA3 on sheets and cuts the sheets with lines LN1 and LN2, which is the scheduled cutting positions. Thereafter, the user needs to sort the sheets on which the images IMa, IMb, IMc, and IMd are printed, respectively. Normally, at the time of sorting, the paper on which the imposition pattern PA1 is printed, the paper on which the imposition pattern PA2 is printed, and the paper on which the imposition pattern PA3 is printed exist in a stacked state. Therefore, under the assumption described above, it is necessary for the user to sort the sheets on which the images IMa, IMb, IMc, and IMd are printed by visually checking the printed images, while flipping the sheets one by one. The work becomes complicated.

Therefore, in the present embodiment, the MFP 100 arranges (gives) marks corresponding to each of the plural kinds of images IMa, IMb, IMc, and IMd, on the scheduled cutting positions of the imposition patterns PA1, PA2, and PA3.

Figure 5:
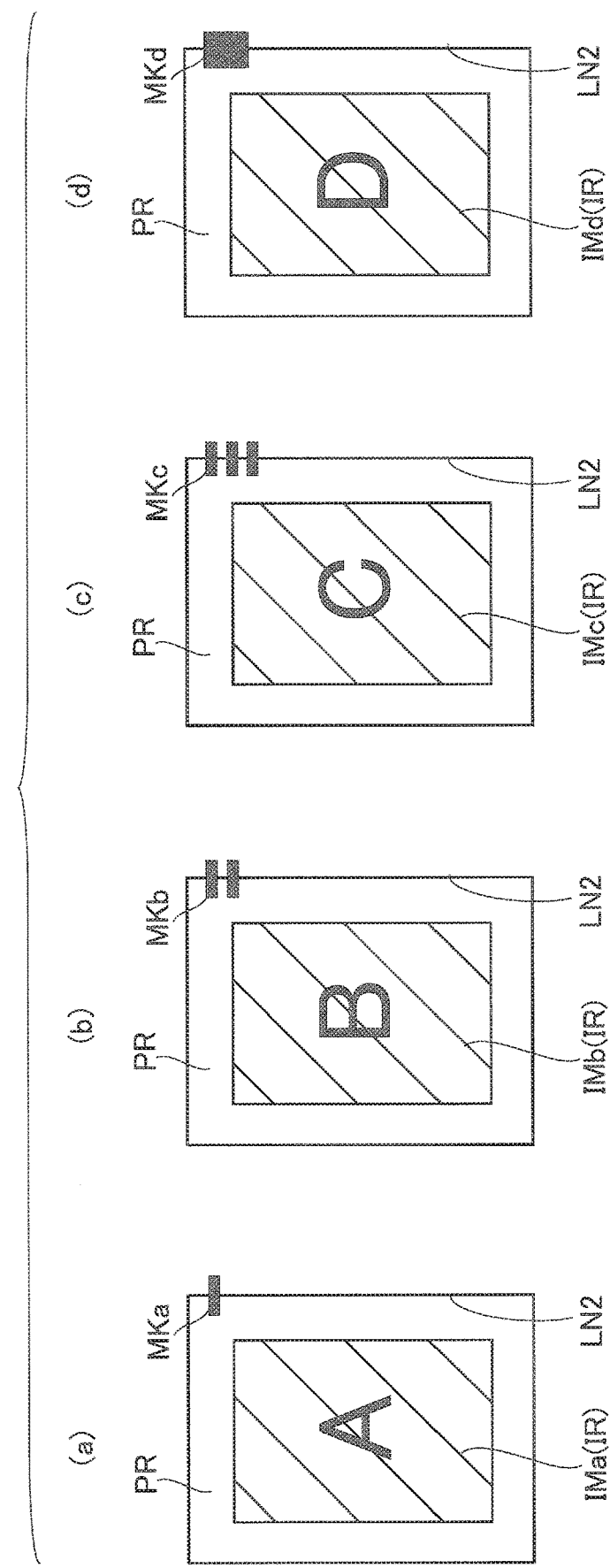
FIG. 5 is a diagram showing marks corresponding to images IMa, IMb, IMc, and IMd, according to the first embodiment of the present invention.

FIG. 5 is a diagram showing marks corresponding to images IMa, IMb, IMc, and IMd, according to the first embodiment of the present invention.

With reference to FIG. 5, in the present embodiment, a mark MKa corresponding to image IMa is arranged in the segmented area where image IMa is placed. The mark MKa is composed of a narrow horizontal line. A mark MKb corresponding to the image IMb is arranged in the segmented area where the image IMb is arranged. The mark MKb is composed of two narrow horizontal lines. A mark MKc corresponding to the image IMc is placed in the segmented area where the image IMc is placed. The mark MKc is composed of three narrow horizontal lines. A mark MKd corresponding to the image IMd is placed in the segmented area where the image IMd is placed. Mark MKd is composed of a thick horizontal line.

Figure 6:
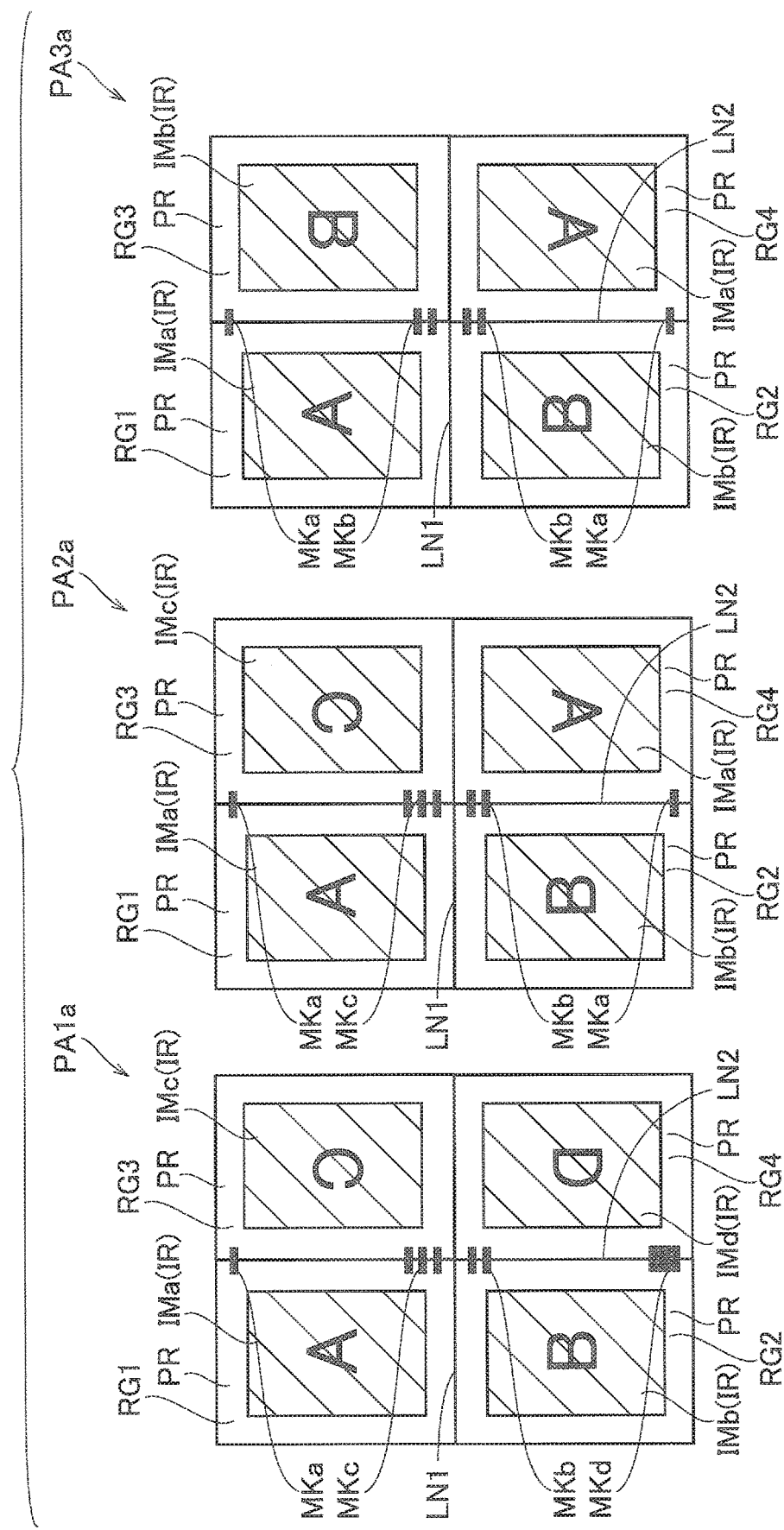
FIG. 6 is a diagram schematically showing imposition patterns PA1a, PA2a, and PA3a after the marks are arranged, in the first embodiment of the present invention.

FIG. 6 is a diagram schematically showing imposition patterns PA1a, PA2a, and PA3a after the marks are arranged in the first embodiment of the present invention. In the imposition pattern PA1a, marks are arranged on the imposition pattern PA1. The imposition pattern PA2a has marks arranged on the imposition pattern PA2. In the imposition pattern PA3a, marks are arranged on the imposition pattern PA3.

With reference to FIGS. 5 and 6, each of the marks MKa, MKb, MKc, and MKd will be described. These marks are arranged at substantially the same position in the outer peripheral regions PR in the segmented areas where the marks are placed. Each of the marks MKa, MKb, MKc, and MKd reaches another segmented area adjacent to the segmented area, across the line LN2 from the segmented area where they are located.

Specifically, in the imposition pattern PA1a shown in FIG. 6, the mark MKa is arranged at the upper right position of the outer peripheral region PR in the segmented area RG1, when the image IMa is viewed in the upright state. It reaches the segmented area RG3 that is adjacent to the segmented area RG1 across the line LN2. The mark MKb is located at the upper right position of the outer peripheral region PR in the segmented area RG2, when the image IMb is viewed in an upright state. It reaches the segmented area RG4 adjacent to the segmented area RG2 across the line LN2. The mark MKc is arranged at the upper right position of the outer peripheral region PR in the segmented area RG3, when the image IMc is viewed in the upright state. It reaches the segmented area RG1 that is adjacent to the segmented area RG3 across the line LN2. The mark MKd is arranged at the upper right position of the outer peripheral region PR in the segmented area RG4, when the image IMd is viewed in the upright state. It reaches the segmented area RG2 that is adjacent to the segmented area RG4 across the line LN2.

In addition, the plurality of marks are arranged at approximately the same position in the segmented areas. The image to be imposed on one side (for example, the left side) on the paper is made to be upright. The image to be imposed on the other side (for example, the right side) on the paper is inverted. As a result, the mark to be imparted to the upright image and the mark to be imparted to the inverted image are arranged on the same scheduled cutting position.

Specifically, in the imposition pattern PA1a, each of the marks MKa, MKb, MKc, and MKd is arranged at substantially the same upper right position in the segmented area, when the image is viewed in the upright state. The images IMa and IMb to be imposed on the left side of the sheet are made to be upright. Images IMc and IMd to be imposed on the right side of the sheet are inverted. As a result, the marks MKa, MKb, MKc, and MKd are arranged on the line LN2. As a result, the new edge of the paper appearing due to cutting at the line LN2 is located at the same position (the right side when the image is viewed in the upright state) in each of the segmented areas RG1, RG2, RG3, and RG4. The printing positions of the marks are located at other than the end of the paper on which the imposition pattern is printed. As a result, printing is facilitated. (It is possible to print images of marks, even with a printing device that can not print on the edge of paper.) The user can easily sort papers after printing.

It should be noted that the marks may be provided at an arbitrary scheduled cutting position. As described above, the marks may be arranged at a scheduled cutting position in the front side of the sheet (the side on which the image is printed). The marks may be arranged at a scheduled cutting position in the back side of the sheet (the side on which the image is not printed). The marks may be arranged at a scheduled cutting position in both the front surface and the back surface of the paper. In addition, the marks may be different in at least one of position, color, shape, and presence/absence of existence, depending on the kind of the corresponding image.

The MFP 100 forms an image of the imposition pattern PA1a on a sheet and outputs 50 copies of the printed sheet. The MFP 100 forms an image of the imposition pattern PA2a on a sheet and outputs 30 copies of the printed sheet. The MFP 100 forms an image of the imposition pattern PA3a on a sheet and outputs 20 copies of the printed sheet. (A total of 100 copies are output).

Figure 7A:
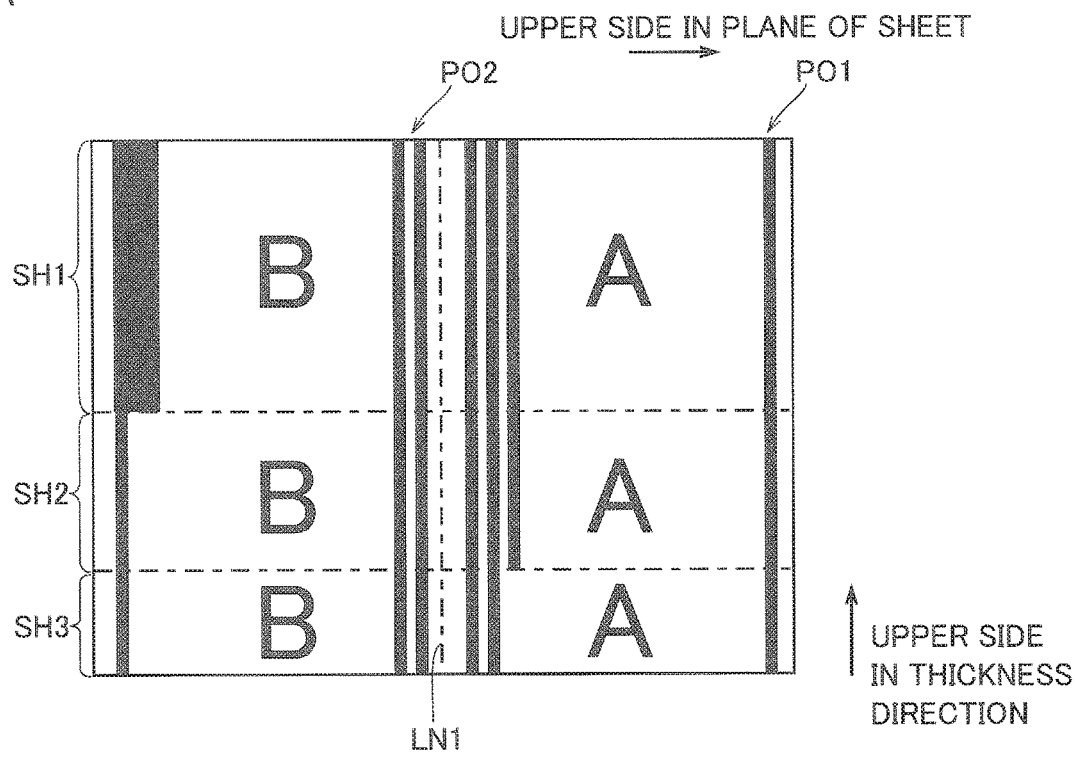
FIGS. 7A and 7B are diagrams for explaining the first embodiment of the present invention. The sheets SH1 on which the imposition patterns PA1a are printed, the sheets SH2 on which the imposition patterns PA2a are printed, and the sheets SH3 on which the imposition patterns PA3a, are printed. In a state the sheets are stacked, the cutting surface of them cut by the line LN2 is shown.
Figure 7B:
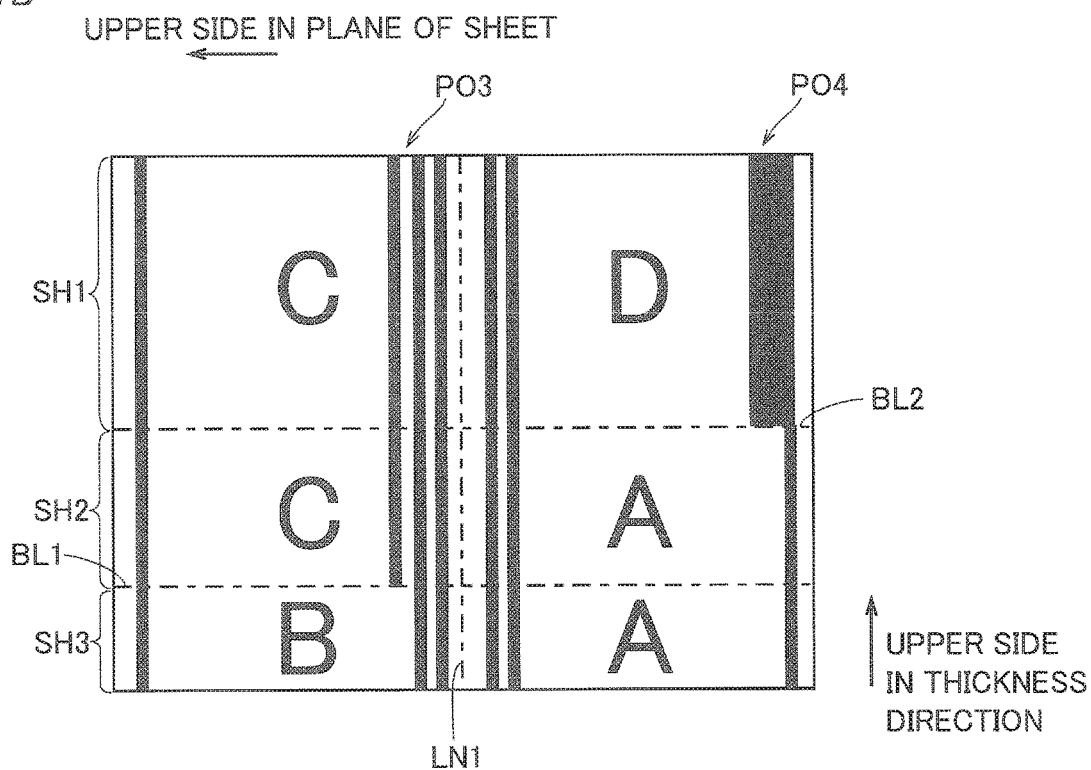

FIGS. 7A and 7B are diagrams for explaining the first embodiment of the present invention. The sheets SH1 on which the imposition pattern PA1a is printed, the sheets SH2 on which the imposition pattern PA2a is printed, and the sheets SH3 on which the imposition pattern PA3a is printed, are stacked. In a state the sheets are stacked, the cutting surface of them cut by the line LN2 is shown. FIG. 7A shows a cutting surface of a stack of sheets on which images existing on the left side of the line LN2 in FIG. 6 are printed. FIG. 7B shows a cutting surface of a stack of sheets on which images existing on the right side of the line LN2 are printed. The upper side in the plane of the sheet in FIGS. 7A and 7B means the upper side in FIG. 6. In FIGS. 7A and 7B, the letter "A" is attached to the sheets on which the image IMa is printed, for convenience of explanation. Also, the letter "B" is attached to the sheets on which the image IMb is printed. The letter "C" is attached to the sheets on which the image IMc is printed. The letter "D" is attached to the sheets on which the image IMd is printed.

With reference to FIGS. 7A and 7B, it is possible to sort paper SH1 on which imposition pattern PA1a is printed, paper SH2 on which imposition pattern PA2a is printed, and paper SH3 on which imposition pattern PA3a is printed, based on the pattern appearing on the cutting surface. This pattern is caused by the marks given.

A pattern of one thin line caused by the mark MKa is formed on the cutting surface of the position PO1 at the upper side in the plane of the sheet (the upper portion in FIG. 6 and the right portion in FIG. 7A). It appears on all the sheets of the stacked sheets of paper. As a result, at the upper side in the plane of the sheet (the right side in FIG. 7A) of the bundle of sheets in FIG. 7A, it can be visually discriminated that the sheets on which the image IMa is printed exist.

Two thin lines pattern appears on the cutting surface of the position PO2 near the line LN1 in FIG. 7A, and on the lower side in the plane of the sheet (the left side in FIG. 7A) than the line LN1. This is a pattern caused by the mark MKb. It appears on the stacked sheets of paper. As a result, at the lower side in the plane of the sheet of the bundle of sheets in FIG. 7A (the left side in FIGS. 7A and 7B), it can be visually determined that the sheets on which the image IMb is printed exists.

Therefore, the image IMa is printed on the upper side in the plane of the sheet and the image IMb is printed on the lower side in the plane of the sheet, in the bundle of sheets of FIG. 7A. This can be visually discriminated.

The cutting surface of the position PO3 near the line LN1 in FIG. 7B and above the line LN1 (the left side in FIG. 7B) is observed. At the position PO3, three thin lines pattern resulting from the mark MKc and two thin lines pattern resulting from the mark MKb appear. The pattern of three thin lines resulting from the mark MKc appear at the upper side in the thickness direction of the sheet, with respect to the pattern of the two thin lines caused by the mark MKb. Therefore, on the upper side in the plane of the sheet (the left side in FIG. 7B) of the bundle of paper in FIG. 7B, the paper on which the image IMb is printed and the paper on which the image IMc is printed exist. The paper on which the image IMc is printed is stacked on the paper on which the image IMb is printed, with the boundary line BL 1. This can be visually discriminated.

The cut surface of the position PO4 at the lower end portion (the right end portion in FIG. 7B) in the plane of the sheet in FIG. 7B is observed. In the position PO4, a pattern of one thick line due to the mark MKd and a pattern of one thin line caused by the mark MKa appear. The pattern of one thick line resulting from the mark MKd appears on the upper side in the thickness direction of the sheet, with respect to the pattern of one thin line caused by the mark MKa. Therefore, at the lower side in the plane of the sheet of the bundle of paper in FIG. 7B (the right side in FIG. 7B), there are paper on which the image IMd is printed and the paper on which the image IMa is printed. The paper on which the image IMd is printed is stacked on the paper on which the image IMa is printed, with the boundary line BL2. This can be visually discriminated.

In other words, the sheets SH3 are present at the lowermost portion of the bundle of sheets of FIG. 7B (the lower part of FIG. 7B). The image IMb is printed at the upper side in the plane of the sheet of the sheets SH3 (the left in FIG. 7B), and the image IMa is printed on the lower side in the plane of the sheet (the right side of FIG. 7B). This can be visually discriminated. Between the boundary lines BL1 and BL2 of the bundle of sheets of FIG. 7B, the sheets SH2 exist. The image IMc is printed at the upper side in the plane of the sheet of the sheets SH2 (the left in FIG. 7B) and the image IMa is printed at the lower side in the plane of the sheet (the right in FIG. 7B). This can be visually discriminated. The sheets SH1 exist above the boundary line BL2 of the bundle of sheets of FIG. 7B. The image IMc is printed on the upper side in the plane of the sheet of the sheets SH1 (the left in FIG. 7B) and the image IMd is printed on the lower side in the plane of the sheet (the right in FIG. 7B). This can be visually discriminated.

Second Embodiment

The MFP 100 according to the present embodiment creates the imposition patterns PA1b, PA2b, and PA3b. The marks MLb, MLc, and MLd are further arranged (added) on the registration marks, with respect to the imposition patterns PA1a, PA2a, and PA3a, in the imposition patterns PA1b, PA2b, and PA3b. Each of the marks MLb, MLc, and MLd corresponds to each of the images IMb, IMc, and IMd. The registration marks are indexes provided in the outer peripheral regions PR, in order to indicate the scheduled cutting position, for cutting the image regions IR from the outer peripheral regions PR.

Figure 8:
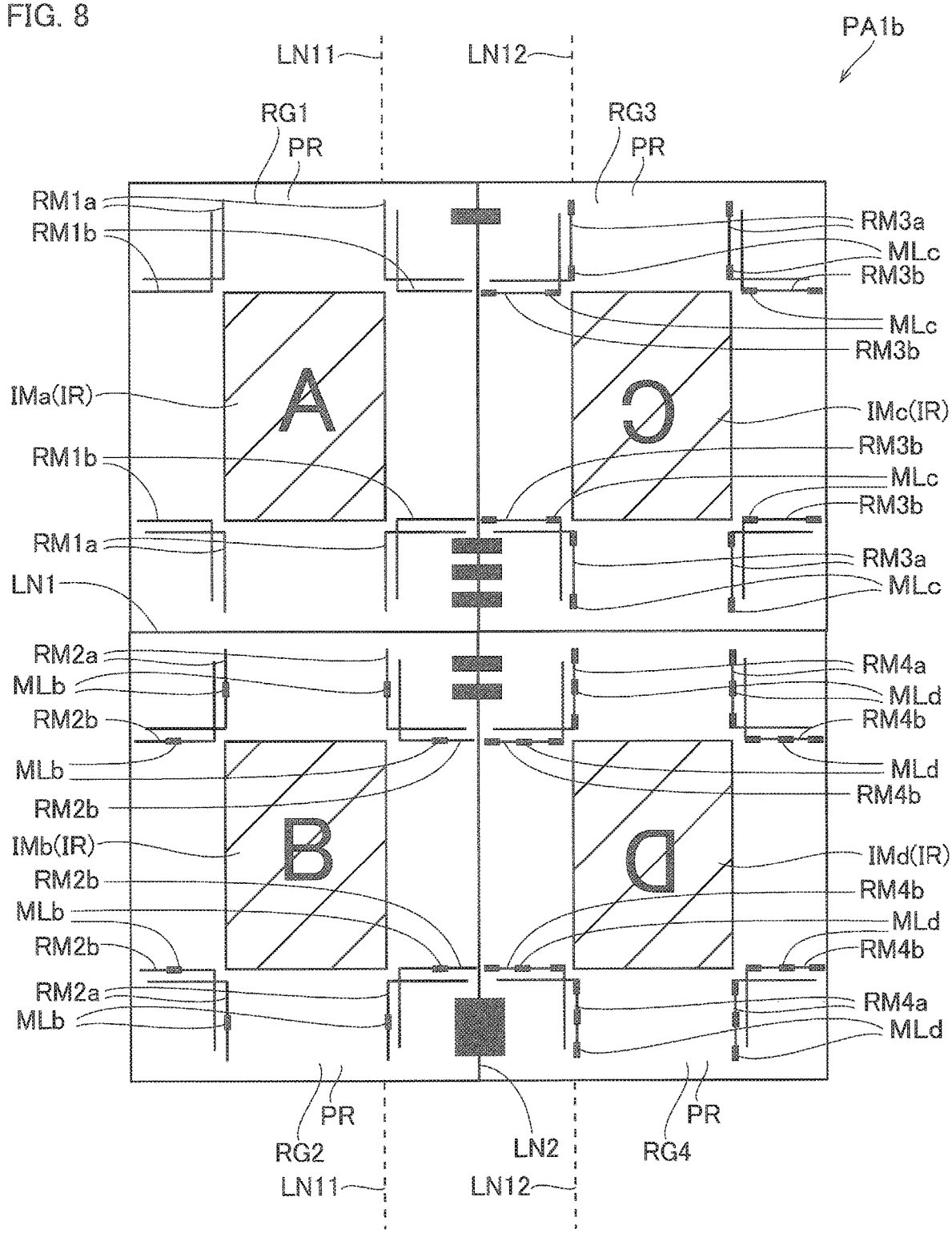
FIG. 8 is a diagram schematically showing an imposition pattern PA1b after a mark is arranged on registration marks, according to a second embodiment of the present invention.

FIG. 8 is a diagram schematically showing the imposition pattern PA1b after the marks are arranged on the registration marks, according to the second embodiment of the present invention. Note that the lines LN11 and LN12 in FIG. 8 are parts of the scheduled cutting positions indicated by registration marks.

Referring to FIG. 8, within segmented area RG1 to which image IMa is allocated, the registration mark RM1a indicating the scheduled cutting position to be cut in the vertical direction of the sheet surface is described. In addition, the registration mark RM1b indicating the scheduled cutting position to be cut in the lateral direction of the sheet surface is described. The registration marks indicate the scheduled cutting positions of the boundary between the image region IR and the peripheral region PR. No marks are arranged on each of the registration marks RM1a and RM1b. The image IMa is distinguished from other images, since there is no mark on the registration mark.

In the segmented area RG2 to which the image IMb is allocated, the registration mark RM2a indicating the scheduled cutting position to be cut in the vertical direction of the sheet surface is described. In addition, the registration mark RM2b showing the scheduled cutting position to be cut in the lateral direction of the sheet surface is described. The registration marks indicate the scheduled cutting position of the boundary between the image region IR and the peripheral region PR. Marks MLb are arranged in each of registration marks RM2a and RM2b. The mark MLb is composed of one thick line. In other words, the mark MLb is one where a portion of each of the registration marks RM2a and RM2b is thickened.

In the segmented area RG3 to which the image IMc is allocated, the registration mark RM3a indicating the scheduled cutting position to be cut in the vertical direction of the sheet surface is described. Further, the registration mark RM3b showing the scheduled cutting position to be cut in the lateral direction of the sheet surface is described. The registration marks indicate the scheduled cutting positions of the boundary between the image region IR and the peripheral region PR. The marks MLc are arranged on each of the registration marks RM3a and RM3b. The mark MLc is composed of two lines. In other words, the mark MLc is obtained by thickening two places of each of the registration marks RM3a and RM3b.

In the segmented area RG4 to which the image IMd is allocated, the registration marks RM4a showing the scheduled cutting position to be cut in the vertical direction of the sheet surface is described. In addition, the registration mark RM4b showing the scheduled cutting position to be cut in the lateral direction of the sheet surface are described. The registration marks indicate the scheduled cutting positions of the boundary between the image region IR and the peripheral region PR. Marks MLd are arranged in each of registration marks RM4a and RM4b. The mark MLd is composed of three lines. In other words, the mark MLd is obtained by thickening the three points of each of the registration marks RM4a and RM4b.

As described above, the marks are placed on the registration marks RM2a, RM3a, and RM4a indicating the scheduled cutting positions to be cut in the vertical direction of the sheet surface. Marks are placed on registration marks RM2b, RM3b, and RM4b that indicate the scheduled cutting positions to cut in the left and right direction of the sheet surface. The marks are placed on both the registration marks RM2a, RM3a and RM4a, and the registration marks RM2b, RM3b and RM4b. This makes it possible to judge the kind of the image, based on the mark appearing on the cutting surface of the paper, regardless of which cutting position is cut first.

Although not shown, each of the imposition patterns PA2b and PA3b is the same as the imposition pattern PA1b. For each of the imposition patterns PA2a and PA3a, furthermore, the marks MLb and MLc (or mark MLb) are arranged at appropriate positions on the registration mark.

Figure 9A:
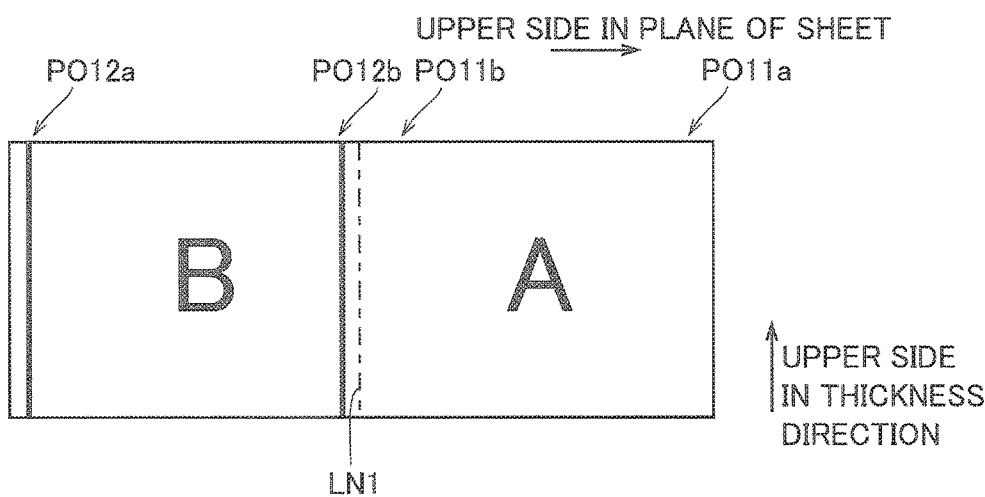
FIGS. 9A and 9B are diagrams for explaining the second embodiment of the present invention, which is a view showing the cutting surface cut by lines LN11 and LN12 in FIG. 8, in a state sheets are stacked after printing the imposition pattern PA1b.
Figure 9B:
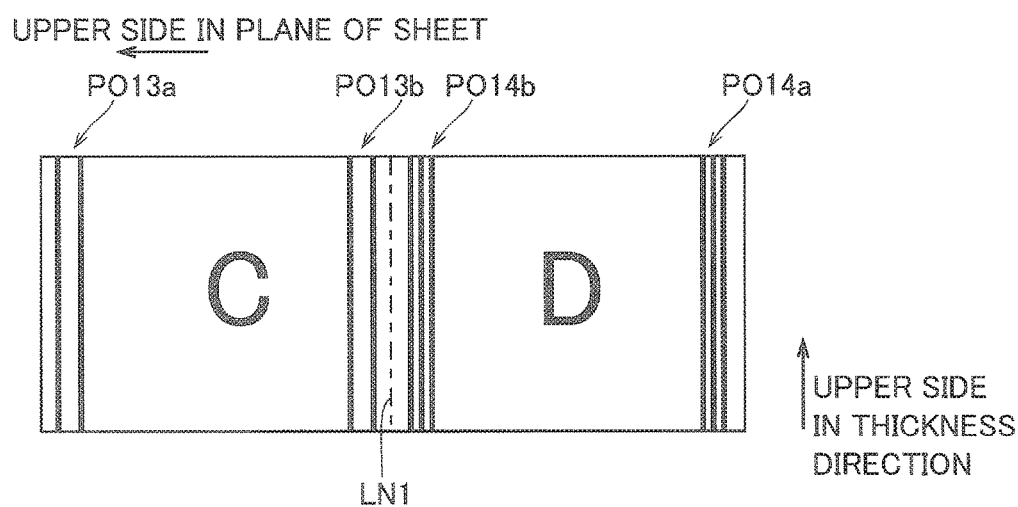

FIGS. 9A and 9B are diagrams for explaining the second embodiment of the present invention, which is a view showing a cutting surface cut by lines LN11 and LN12 in FIG. 8, in a state sheets are stacked after printing the imposition pattern PA1b. FIG. 9A is a view showing a cutting surface cut by line LN11 in FIG. 8. FIG. 9B is a view showing a cutting surface cut by the line LN12 in FIG. 8. The upper side in the plane of the sheet in FIGS. 9A and 9B means the upper side in FIG. 8. In FIGS. 9A and 9B, for convenience of description, the letter "A" is attached to the paper on which the image IMa is printed. The letter "B" is attached to the paper on which the image IMb is printed. The letter "C" is attached to the paper on which the image IMc is printed. The letter "D" is attached to the paper on which the image IMd is printed.

With reference to FIGS. 9A and 9B, sheets on which the image IMa is printed, sheets on which the image IMb is printed, sheets on which the image IMc is printed, sheets on which the image IMd is printed can be sorted, according to the pattern appearing on the cutting surface.

A pattern caused by marks does not appear at the position PO11a on the cutting surface at the upper portion in the plane of the sheet in FIG. 9A. A pattern caused by marks does not appear at the position PO11b on the cutting surface, near the line LN1 and above the line LN1 in the plane of the sheet (in FIG. 9A, right of the line LN1). As a result, on the upper side in the plane of the sheet of the bundle of sheets of FIG. 9A, the sheets on which the image IMa is printed exist. This can be visually discriminated.

In the position PO12a on the cutting surface at the lower end portion in the plane of the sheet in FIG. 9A, a pattern of one line caused by the marks MLb appears. A pattern of one line caused by the marks MLb appears on the cutting surface of the position PO12b near the line LN1 and below the line LN1 in the plane of the sheet. As a result, on the lower side in the plane of the sheet of the bundle of sheets of FIG. 9A, the sheets on which the image IMb is printed exist. This can be visually discriminated.

In the position PO13a at the upper end in the plane of the sheet in FIG. 9B, a two lines pattern arising from the marks MLc appear. On the cutting surface of the position PO13b near the line LN1 and above the line LN1, two lines pattern resulting from the marks MLc appear. As a result, sheets on which the image IMc is printed exist on the upper side in the plane of the sheet of the bundle of sheets of FIG. 9B. This can be visually discriminated.

In the position PO14a on the cutting surface at the lower end portion in the plane of the sheet in FIG. 9B, a three lines pattern arising from the marks MLd appear. A three lines pattern resulting from the marks MLd appear on the cutting surface of the position PO14b near the line LN1 and below the line LN1. Thereby, on the lower side in the plane of the sheet of the bundle of sheets of FIG. 9B, the sheets on which the image IMd is printed is present. This can be visually discriminated.

The configuration of the MFP 100 and other operations than those described above are the same as those in the first embodiment, so that description thereof will not be repeated.

Third Embodiment

When receiving a plurality of print jobs JA, JB, JC, and JD within a predetermined time, the MFP 100 according to the present embodiment performs imposition process. In the imposition process, images IMa, IMb, IMc, and IMd of a plurality of print jobs JA, JB, JC, and JD are allocated to each sheet one by one.

Figure 10:
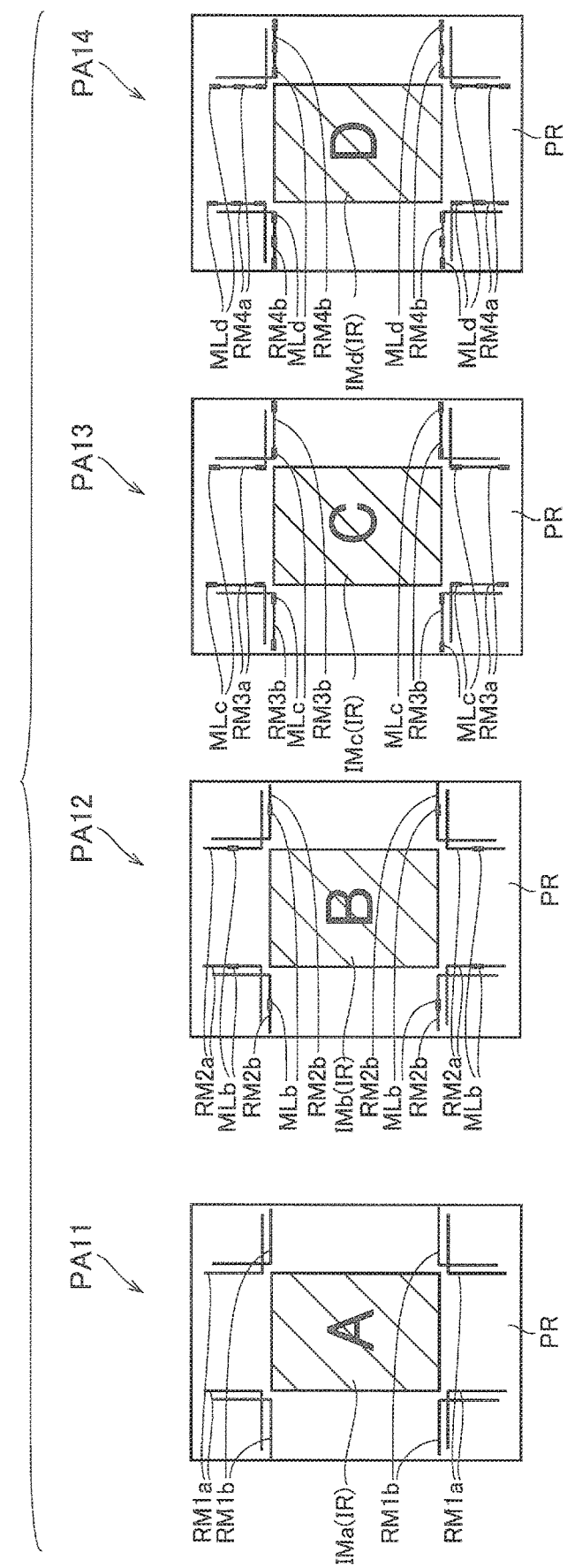
FIG. 10 is a diagram showing a third embodiment of the present invention. The imposition patterns PA11, PA12, PA13, and PA14 created by imposing the images IMa, IMb, IMc, and IMd on the sheet are shown.

FIG. 10 is a diagram showing a third embodiment of the present invention. The imposition patterns PA11, PA12, PA13, and PA14 created by imposing the images IMa, IMb, IMc, and IMd on the sheets are shown.

Referring to FIG. 10, each of the imposition patterns PA11, PA12, PA13, and PA14 has only one segmented area which is an area for forming an image.

The MFP 100 creates an image IMa in FIG. 8 and registration marks RM1a and RM1b arranged, as the imposition pattern PA11. The MFP 100 creates an imposition pattern PA12 in which the image IMb, the registration marks RM2a and RM2b, and the marks MLb in FIG. 8 are arranged. The MFP 100 creates an image IMc, marks RM3a and RM3b, and mark MLc in FIG. 8 arranged as the imposition pattern PA13. The MFP 100 creates an image IMd, registration marks RM4a and RM4b, and mark MLd in FIG. 8 arranged as the imposition pattern PA14.

The MFP 100 outputs 150 copies of the paper on which the image including the imposition pattern PA1 is printed. 120 sheets of paper on which the image including the imposition pattern PA12 is printed is output. 80 sheets of paper on which the image including the imposition pattern PA13 is printed is output. 50 sheets of paper on which the image including the imposition pattern PA14 is printed is output (400 copies in total are output).

The configuration of the MFP 100 and other operations than those described above are the same as those in the first embodiment, so that description thereof will not be repeated.

Fourth Embodiment

In the present embodiment, a flowchart of operations of the MFP 100 according to the first to third embodiments will be described.

Figure 11:
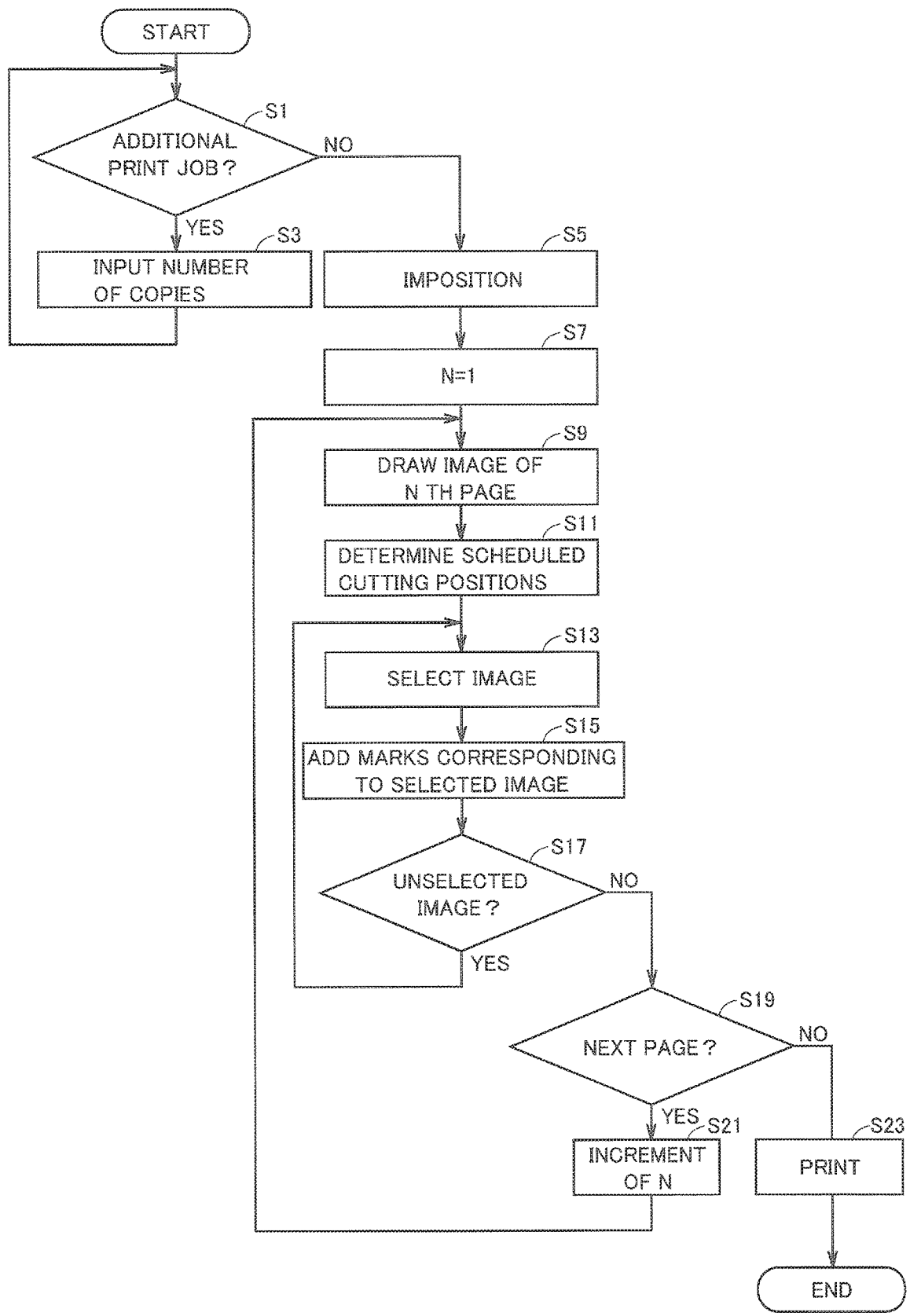
FIG. 11 is a flowchart of operations of the MFP 100, according to the first to third embodiments.

FIG. 11 is a flowchart of operations of the MFP 100, according to the first to third embodiments.

Referring to FIG. 11, the CPU 101 determines whether an addition (input) of a print job has been received within a predetermined time (S 1).

If it is determined in step S1 that an addition (input) of a print job has been received within a predetermined time (YES in S1), the CPU 101 accepts input of the number of print copies of the received print job (S3). Thereafter, the process proceeds to step S1.

If it is determined in step S1 that addition (input) of a print job is not received within a predetermined time (NO in S1), the CPU 101 performs imposition process of the images of the received print jobs (S5). In the imposition process, imposition patterns are created, and the imposition pattern to be printed on each page of the paper is determined. For example, in the case of the first and second embodiments, in step S5, it is determined to print the imposition pattern PA1 on the first to fifty pages of paper. It is determined to print the imposition pattern PA2 on the sheets of page 51 to page 80. It is determined to print the imposition pattern PA3 on the sheets of page 81 to page 100.

Subsequently, the CPU 101 sets the variable N to 1 (S7), and draws the imposition pattern on the Nth page paper (S9). Next, the CPU 101 determines (calculates) the scheduled cutting positions of the Nth page of paper (S11). For example, in the case of the first embodiment, lines LN1, LN2, and LN3 are determined in step S11. In the case of the second embodiment, the positions of the lines LN1 and LN2, and the registration marks RM1a, RM1b, RM2a, RM2b, RM3a, RM3b, RM4a, and RM4b are determined in step S11.

Next, the CPU 101 selects one unselected image out of the images drawn on the Nth page of paper (In the case of the first and second embodiments, these are images IMa, IMb, IMc and IMd, when images of the first page of paper are drawn) (S13), and places (adds) the mark corresponding to the selected image (S15).

Subsequently, the CPU 101 determines whether or not there is an unselected image in the image drawn on the Nth page of paper (S17).

If it is determined in step S17 that there is an unselected image in the image drawn on the Nth page of paper (YES in S17), the CPU 101 proceeds to the process in step S13 and selects the unselected image.

If it is determined in step S17 that there is no unselected image in the image drawn on the Nth page of paper (NO in S17), the CPU 101 determines whether or not there is a sheet of the next page ((N+1)th page) to which the imposition pattern is assigned (S19).

If it is determined in step S19 that there is a sheet of the next page to which the imposition pattern is assigned (YES in S19), the CPU 101 increments the variable N (S21) and proceeds to the process of step S9.

If it is determined in step S19 that there is no sheet of the next page to which the imposition pattern is assigned (NO in S19), the CPU 101 performs printing (S23) and ends the process.

Effect of Embodiment

According to the above-described embodiments, when sorting is performed after cutting, the type of image can be determined based on the mark appearing on the end face (cutting surface) of the paper. Therefore, it is possible to easily sort the sheets after cutting.

According to the second embodiment, the marks are arranged on the registration marks. This makes it possible to judge the type of image based on the mark appearing on the end face of the paper just before the final cutting. Also, marks on the registration marks are removed from the image at the time of the final cutting. As a result, it is possible to easily sort the sheets, even at the time of final cutting, without adversely affecting the image formed on the sheet.

According to the third embodiment, it is possible to omit the operation of cutting each of the segmented areas, so that the cutting operation can be simplified.

According to the present embodiment, it is possible to provide an image processing apparatus, an image forming apparatus, a control program of an image processing apparatus, and a control program of an image forming apparatus which can easily sort papers after cutting.

[Others]

In the second embodiment, it is not necessary to provide marks on the lines LN1 and LN2, which are scheduled cutting positions for separating the segmented areas.

In the present invention, the image processing apparatus may perform processing of creating imposition patterns to which marks are assigned, and transmit the created imposition patterns to an image forming apparatus.

The processes in the above-mentioned embodiments can be performed by software and a hardware circuit. A computer program which executes the processes in the above embodiments can be provided. The program may be provided recorded in recording media of CD-ROMs, flexible disks, hard disks, ROMs, RAMs, memory cards, or the like to users. The program is executed by a computer of a CPU or the like. The program may be downloaded to an apparatus via communication lines like the internet. The processes explained in the above flowcharts and the description are executed by a CPU in line with the program.

Although the present invention has been described and illustrated in detail, the disclosed embodiments are made for purposes of illustrated and example only and not limitation. The scope of the present invention being interpreted by terms of the appended claims.

What is claimed is:

1. An image processing apparatus used in a printing method for obtaining each of plural kinds of images by printing the plural kinds of images on paper, and cutting the paper after the printing, the image processing apparatus comprising a hardware processor that:
   arranges marks corresponding to the plural kinds of images at planned cutting positions; and
   performs an imposition process for allocating segmented areas which are areas for forming images of each of the plural kinds of images, on one surface of one sheet of paper,
   wherein the imposition process allocates the segmented areas and changes a rotational orientation of part of the plural kinds of images depending on the allocated segmented areas, such that the images after the cutting each have a new edge, which is a new edge of the sheet generated by the cutting, the new edge being located at a same side of the cut images when the cut images are viewed in a same rotational orientation.

2. The image processing apparatus according to claim 1, wherein the hardware processor:
   arranges the marks at the planned cutting positions on at least one of a first surface and a second surface of the one sheet of paper.

3. The image processing apparatus according to claim 2, wherein:
   the marks are provided at substantially same positions in the segmented areas, and each of the marks extends from the segmented area of a corresponding one of the plural kinds of images to another segmented area adjacent thereto, across a respective one of the planned cutting positions.

4. The image processing apparatus according to claim 2, wherein:
   the segmented areas each include an image region where an image is arranged and a peripheral region provided on an outer periphery of the image region, and
   the hardware processor arranges the marks in the peripheral regions of the segmented areas.

5. The image processing apparatus according to claim 4, wherein the hardware processor:
   arranges the marks on an index indicating the planned cutting positions for cutting the image region from the peripheral region.

6. The image processing apparatus according to claim 5, wherein the hardware processor:
   arranges the marks on the index indicating the planned cutting positions for cutting the image region from the peripheral region in both a first direction and a second direction orthogonal to the first direction.

7. The image processing apparatus according to claim 1, wherein:
   the marks differ from each other in at least one of position, color, shape, and presence or absence for each of the plural kinds of images.

8. An image forming apparatus used in a printing method for obtaining each of plural kinds of images by printing the plural kinds of images on paper, and cutting the paper after the printing, the image forming apparatus comprising a hardware processor that:
   receives input of the plural kinds of images;
   forms an image in which marks corresponding to each of the plural kinds of images received are arranged at planned cutting positions; and
   performs an imposition process for allocating segmented areas which are areas for forming images of each of the plural kinds of images, on one surface of one sheet of paper,
   wherein the imposition process allocates the segmented areas and changes a rotational orientation of part of the plural kinds of images depending on the allocated segmented areas, such that the images after the cutting each have a new edge, which is a new edge of the sheet generated by the cutting, the new edge being located at a same side of the cut images when the cut images are viewed in a same rotational orientation.

9. The image forming apparatus according to claim 8, wherein the hardware processor:
   forms the image in which the marks are arranged at the planned cutting positions on at least one of a first surface and a second surface of the one sheet of paper.

10. The image forming apparatus according to claim 9, wherein:
    the segmented areas each include an image region where an image is arranged and a peripheral region provided on an outer periphery of the image region, and
    the hardware processor forms the image in which the marks are arranged in the peripheral regions of the segmented areas.

11. The image processing apparatus according to claim 10, wherein the hardware processor:
    forms the image in which the marks are arranged on an index indicating the planned cutting positions for cutting the image region from the peripheral region.

12. A non-transitory computer-readable recording medium storing a controlling program for an image processing apparatus used in a printing method for obtaining each of plural kinds of images by printing the plural kinds of images on paper, and cutting the paper after the printing, the program causing a computer to execute:
    arranging marks corresponding to the plural kinds of images at planned cutting positions; and
    performing an imposition process for allocating segmented areas which are areas for forming images of each of the plural kinds of images, on one surface of one sheet of paper,
    wherein the imposition process allocates the segmented areas and changes a rotational orientation of part of the plural kinds of images depending on the allocated segmented areas, such that the images after the cutting each have a new edge, which is a new edge of the sheet generated by the cutting, the new edge being located at a same side of the cut images when the cut images are viewed in a same rotational orientation.

13. The non-transitory computer-readable recording medium according to claim 12, wherein the program causes the computer to execute:
    arranging the marks at the planned cutting positions on at least one of a first surface and a second surface of the one sheet of paper.

14. The non-transitory computer-readable recording medium according to claim 13, wherein:
    the segmented areas each include an image region where an image is arranged and a peripheral region provided on an outer periphery of the image region, and
    the program causes the computer to execute:
    arranging the marks in the peripheral regions of the segmented areas.

15. The non-transitory computer-readable recording medium according to claim 14, wherein the program causes the computer to execute:

arranging the marks on an index indicating the planned cutting positions for cutting the image region from the peripheral region.

16. A non-transitory computer-readable recording medium storing a controlling program for an image processing apparatus used in a printing method for obtaining each of plural kinds of images by printing the plural kinds of images on paper, and cutting the paper after the printing, the program causing a computer to execute:

receiving input of the plural kinds of images;

forming an image in which marks corresponding to each of the plural kinds of images received are arranged at planned cutting positions; and performing an imposition process for allocating segmented areas which are areas for forming images of each of the plural kinds of images, on one surface of one sheet of paper, wherein the imposition process allocates the segmented areas and changes a rotational orientation of part of the plural kinds of images depending on the allocated segmented areas, such that the images after the cutting each have a new edge, which is a new edge of the sheet generated by the cutting, the new edge being located at a same side of the cut images when the cut images are viewed in a same rotational orientation.

17. The non-transitory computer-readable recording medium according to claim 16, wherein the program causes the computer to execute:

forming the image in which the marks are arranged at the planned cutting positions on at least one of a first surface and a second surface of the one sheet of paper.

18. The non-transitory computer-readable recording medium according to claim 17, wherein:

the segmented areas each include an image region where an image is arranged and a peripheral region provided on an outer periphery of the image region, and the program causes the computer to execute:

forming the image in which the marks are arranged in the peripheral regions of the segmented areas.

* * * * *